J. R. HOLLEY.
PERCOLATOR.
APPLICATION FILED MAR. 19, 1910.

994,398.

Patented June 6, 1911.

WITNESSES:
George Mortson
Ed. E. Claussen

INVENTOR.
J. R. Holley,
BY Chas. F. Schmelz
ATTORNEY.

THE NORRIS PETERS CO., WASHINGTON, D. C.

UNITED STATES PATENT OFFICE.

JULIAN R. HOLLEY, OF BRISTOL, CONNECTICUT, ASSIGNOR TO THE BRISTOL BRASS COMPANY, OF BRISTOL, CONNECTICUT, A CORPORATION OF CONNECTICUT.

PERCOLATOR.

994,398.  Specification of Letters Patent.  Patented June 6, 1911.

Application filed March 19, 1910. Serial No. 550,316.

*To all whom it may concern:*

Be it known that I, JULIAN R. HOLLEY, a citizen of the United States, and resident of Bristol, in the county of Hartford and State of Connecticut, have invented certain new and useful Improvements in Percolators, of which the following is a full, clear, and exact specification.

This invention relates to percolators and similar apparatus, and more particularly to what is generally known as the "pump mechanism" thereof, and it has for one of its objects the provision of an improved device of this character whereby small quantities of liquid are repeatedly brought to a boiling point, and the steam generated through the ebullition will become effective in projecting hot water above the level in the main body of the liquid in the vessel or pot.

The invention has, furthermore, for its object the provision of an automatically closing valve whereby the return of the water in the heating or steam chamber back into the main vessel or pot will be prevented, so that the efficiency of the steam toward the purpose above stated will be greatly enhanced.

Further objects will be found in the particular construction of the pump mechanism as will hereinafter be described and the means for the attainment of which will be particularly pointed out in the claims.

Briefly stated, the present invention is adapted for use in connection with coffee percolators or percolating coffee pots in which a quantity of ground or powdered coffee is contained within a tray above the water level in the main pot, and small quantities of such water are heated in the special chamber provided therefor, and thence projected to a point above the coffee so that this hot water will then be distributed over the same and gradually drip back into the main body of the liquid in the main receptacle.

The invention has been clearly illustrated in the accompanying drawings in which—

Figure 1:
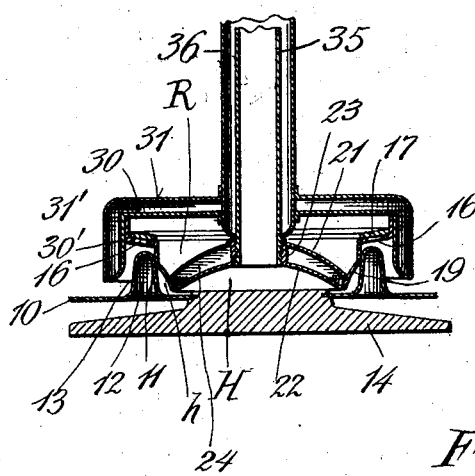
Figure 2:
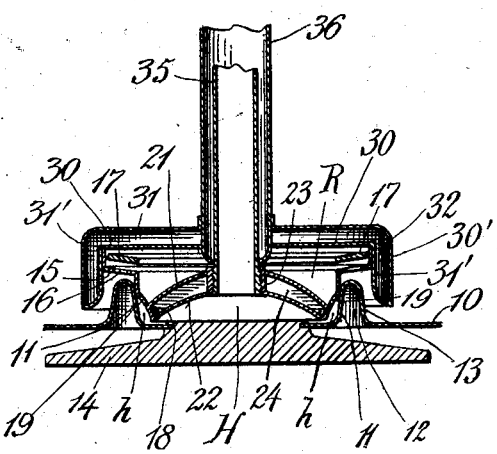
Figure 3:
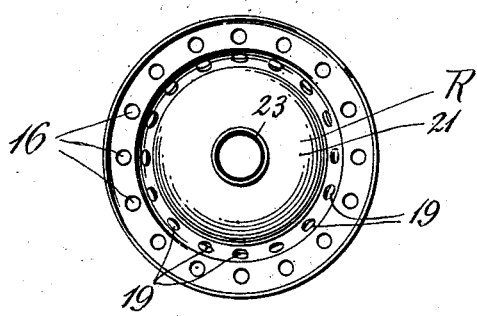

Figure 1 is a central vertical section of the pump portion of my improved mechanism which is herein shown in its normal condition with the valve closed. Fig. 2 is a similar section showing the position which the valve assumes when fresh water from the main body is admitted into the heating chamber and preparatory to the generation of steam and its consequent impulse imparted thereby, and Fig. 3 is a top view of the valve-containing member of the device which at the same time serves to isolate a small quantity of water from the main body in the vessel or pot, so that the loss of heat therein will be reduced to a minimum.

In the drawings the numeral 10 denotes the cup-shaped bottom-plate of the main vessel or pot for containing liquid, said pot being indented upwardly to form an annular wall 11 which by virtue of the annular air space 12 is isolated from the wall 13, so that consequently such water as may be contained within the pot 10 will be practically separated from that contained within the heating chamber H formed by the annular wall 11 above mentioned, and also by a base-plate 14 which may be secured to the bottom 10 in any suitable manner.

Closely fitted into the heating chamber H, is a cup-shaped shell constituting a receiving-chamber R and having a laterally extending flange 15 provided with a series of apertures 16 through which liquid can pass from the main vessel or pot into said receiving chamber. Normally the apertures 16 are closed as for instance by a valve-ring or annulus 17 which is preferably made of light material such as aluminum, so that when the liquid in the receiving-chamber R should by any means be reduced, the pressure of the liquid in the pot 10 will be able to raise said valve-ring 17 in the manner shown in Fig. 2.

The annular wall 18 of the receiving-chamber R is made slightly receding so as to form a small annular space $h$, into which the liquid can enter from the receiving-chamber R through apertures 19 (see also Fig. 3), it being understood that the upper portion of the wall of the receiving-chamber fits tightly against the wall 11 of the pot bottom.

The bottom of the receiving-chamber is preferably made double and consists of plates 21, 22 which are tightly connected with the receding wall of the chamber and also with a thimble 23 disposed in the center thereof, so that an inclosed air-space 24 will be obtained which serves as an isolating medium to prevent the loss of heat from the liquid contained in the heating-chamber H beneath the plate 18 to the liquid contained in the receiving-chamber R above the plate 21 thereof. It should be noted that the lower rim or line of junction between the wall of the receiving-chamber and the bottom-plate 18 is slightly above the upper surface of the bottom-plate 10, so that consequently the liquid from the annular space $h$ may readily enter into the heating chamber H.

The upper part of the receiving-chamber R is closed by a bonnet or hood comprising an under plate 30 and an upper plate 31 both of said plates having downwardly extending flanges 30' and 31' which are hermetically sealed at the bottom and thus form an inclosed air space 32.

From the foregoing it will be understood that liquid can enter from the main pot, under the lower edge of the hood, thence through the apertures 16 into the receiving-chamber, thence through the apertures 19 and beneath the lower edge of the plate 18 into the heating chamber H.

In screw threaded engagement with the thimble 23, so as to be readily removable therefrom, is an ejector-tube 35 which projects above the ground coffee of the percolator in the usual manner, and which is surrounded by an air-tube 36, the lower end of which is hermetically sealed to said ejector-tube 35 and also to the plates 30, 31 of the hood.

It will now be understood that when heat is applied to the base-plate 14 the liquid contained in the heating-chamber H will be heated to a high degree so that steam will be generated therein very quickly especially in view of the fact that the water above the plate 18 is practically insulated from the liquid in the heating-chamber. When sufficient steam has been generated to form what is generally termed an impulse, a portion of the column of the liquid in the ejector-tube 35 will be projected out of the upper ends thereof and consequently the water in the main pot in endeavoring to seek its own level also in the ejector-tube, will push its way past the gravity valve 17 and consequently furnish a fresh supply to the heating chamber and the ejector tube. Inasmuch as the valve in this instance is gravitative or self-closing, it follows that the steam impulses generated within the heating chamber H can find exit only through the ejector-tube, each impulse serving, furthermore, to crowd the valve 17 against its seat and thus prevent the escape of steam or the return of water from the receiving-chamber into the main pot.

Many changes may be made in the particular construction and organization of the coöperating elements, without departing from the spirit of the invention, and if desired, baffle-plates or other devices may be employed in connection with the device herein shown and described, and consisting substantially of only four separable parts, namely: the pot, the shell of the receiving-chamber, the valve loose therein, and the hood with its ejector and air-tube, so that the device as a whole, is very simple in its construction and yet very efficient in its operation.

I claim:—

In a percolator, the combination with a pot having a cup-shaped bottom, of a cup-shaped-shell seated in said bottom and forming therewith a heating-chamber, said shell having perforations for the passage of liquid into the heating-chamber, and also having a laterally-extending annular flange provided with apertures, a hood for closing the top of said shell to form the latter into a receiving chamber, an annular valve vertically movable within the receiving-chamber and normally closing said apertures, and an ejector tube directly connected with the central portion of said shell and in constant communication with said heating-chamber.

JULIAN R. HOLLEY.

Witnesses:
A. D. WILSON,
C. F. SCHMELZ.

---

Copies of this patent may be obtained for five cents each, by addressing the "Commissioner of Patents, Washington, D. C."